United States Patent [19]

Trojer et al.

[11] 4,275,102

[45] Jun. 23, 1981

[54] METHOD FOR MANUFACTURING A PANEL OF ANISOTROPIC CERAMIC GLASS

[75] Inventors: Felix Trojer, Chene-Bourg; John Briggs, Onex, both of Switzerland

[73] Assignee: Battelle Memorial Institute, Geneva, Switzerland

[21] Appl. No.: 870,882

[22] Filed: Jan. 20, 1978

Related U.S. Application Data

[63] Continuation-in-part of Ser. No. 707,756, Jul. 22, 1976, abandoned.

[30] Foreign Application Priority Data

Jul. 22, 1975 [CH] Switzerland ..................... 9557/75

[51] Int. Cl.³ ..................... B32B 7/00; B32B 17/00
[52] U.S. Cl. ..................... 428/119; 428/105; 428/328; 428/404; 428/432; 428/188; 428/697; 340/782

[58] Field of Search ............... 428/105, 119, 188, 329, 428/432, 539, 404, 328

[56] References Cited

U.S. PATENT DOCUMENTS

| 3,758,705 | 9/1973 | Schmid | 174/113 R |
| 3,809,543 | 5/1974 | Gaskell | 65/33 |
| 4,056,654 | 11/1977 | Kompanek | 428/409 |

*Primary Examiner*—Ellis P. Robinson
*Attorney, Agent, or Firm*—Robert E. Burns; Emmanuel J. Lobato; Bruce L. Adams

[57] ABSTRACT

A panel of anistropic material comprising acicular crystals enclosed in a vitreous or ceramic matrix. The crystals are oriented perpendicular to the opposite faces of the panel and traverse the panel from one side to the other.

8 Claims, 12 Drawing Figures

33 x 33 x 33 x 33 x 33 x 33 x

METHOD FOR MANUFACTURING A PANEL OF ANISOTROPIC CERAMIC GLASS

This application is a continuation-in-part of Ser. No. 707,756 filed July 22, 1976 now abandoned.

BACKGROUND OF THE INVENTION

This invention relates to a panel of anisotropic material comprising acicular crystals enclosed in a vitreous or ceramic matrix, the crystals being orientated perpendicular to the panel faces and traversing the panel from one side to the other.

According to one method for manufacturing this panel, a homogeneous mineral composition capable of forming a ceramic glass is prepared from a mixture of mineral oxides and/or mineral compounds capable of generating such oxides, and a homogeneous layer of this composition in the vitreous state and of the shape and dimensions of the panel to be obtained is subjected to heat treatment consisting of bringing said layer to a temperature at least equal to its working temperature and greater than the crystallisation temperature of the crystalline phase, and establishing therein a thermal gradient perpendicular to its faces, and then progressively and gradually lowering the temperature of the layer starting from one of its faces, in such a manner as to successively bring each transverse plane of the layer to a temperature lower than the crystallisation range of the crystalline phase, so as to induce nucleation of the crystalline phase in that face plane which is at the lowest temperature followed by the growth of acicular crystals in said phase in the direction of the opposite face, while maintaining the thermal gradient such as to orientate the direction of maximum growth of the crystals perpendicular to the faces of the layer.

Depending on the nature of the crystals, the values of certain physical properties of the panel obtained by this method, such as its electrical or thermal conductivity, its magnetic susceptibility, its dielectric constant, its electro-optical and piezoelectric properties, etc. may be much higher in the direction perpendicular to its faces than in the direction parallel thereto.

This anisotropy may be utilised in various fields of applications of such a panel, notably in the manufacture of devices and apparatus which allow the visualisation and/or recording, in the form of an image, of information supplied in the form of electrical or magnetic signals, and in the manufacture of "memory" devices, designed for example for incorporation in electronic calculators, or in the manufacture of optical devices such as polarising filters or screens.

Anisotropic glass panels of this type are already known, as is their use as screens for cathode ray tubes, with the property of allowing the image formed by such a tube to be visualised and registered electrostatically on a suitable support.

One method for manufacturing these panels consists of mechanically assembling elements of different materials, such as metal needles or fibres and insulating glass. However, given that one of the main qualities which such panels must possess is a structural fineness sufficient to enable images formed by cathode ray tubes to be reproduced without loss of image definition, the conducting elements of the panels must be of very small diameter. It can therefore easily be conceived that their manufacture by this method is very difficult if not impossible to operate industrially.

U.S. Pat. No. 3,758,705 (Anthony P. Schmid) describes a process for manufacturing a glass panel comprising a large number of electrically conducting filiform crystals orientated perpendicularly to the faces of the panel and traversing this latter from one side to the other, the crystals being insulated one from the other by a non-conducting vitreous matrix.

This method consists of inducing nucleation of filiform crystals of reduced rutile, $Ti_x O_{2x-1}$, in a transverse plane of a mass of fused glass with the property of being able to be converted into a ceramic glass by the effect of appropriate heat treatment, the nucleation being triggered off by cooling the glass mass in the said plane to a convenient temperature, then making the crystals grow in this mass by gradually cooling adjacent transverse planes while maintaining a unidirectional thermal gradient parallel to the desired direction of growth of the crystals.

According to the U.S. Pat. No. 3,758,705, the mass of fused glass is placed in a refractory crucible, and nucleation of the rutile crystals is triggered off at the bottom of the mass by cooling the base of the crucible by a gas stream at ambient temperature. A vertical thermal gradient is thus created between the bottom of the glass mass and its upper free surface. Crystallisation of the rutile crystals is obtained while continuing to direct the gas stream onto the bottom of the crucible, so as to cause progressive cooling of the glass mass starting from the bottom.

To obtain elongated crystals constantly orientated perpendicularly to the faces of the glass panel and of regular structure from one to the other panel face, a constant cooling speed must be maintained appropriate to the speed of growth of the crystals, requiring the thermal gradient to be likewise maintained as constant as possible during the entire growth period.

The cooling method described in the U.S. Pat. No. 3,758,705 (gas stream directed onto the bottom of the crucible containing the fused homogeneous glass mass and, possibly, also on the upper free surface of the mass) is not very suitable for optimum adjustment of the cooling speed or for maintaining a constant thermal gradient during crystal growth.

In particular, according to the manner of operation of the method described in Example 2 of that Patent, the temperature of the bottom of the glass mass is firstly lowered below the lower limit of the crystallisation range of the crystalline phase starting from a temperature above this range, while maintaining the temperature of the top of the glass mass constant. The temperature of the top of the glass mass is then likewise lowered below the lower limit of the crystallisation range of the crystalline phase while maintaining the temperature of the bottom of the mass constant.

Thus the thermal gradient between the top and bottom of the glass mass does not remain constant during crystallisation of the crystalline phase, but increases during the first afore-mentioned period and then decreases, so that at the end of crystallisation it has almost returned to its original value.

Furthermore, in the above panel with rutile crystals, electrical conductivity is very unstable and varies widely, because it is dependent upon the non-stoichiometric state, i.e. $Ti_xO_{2x-1}$, which is produced from reducing $TiO_2$. Therefore, in this case, the reducing atmosphere must be critically controlled to obtain an adequate electrical conductivity, and moreover nonstoichiometric solid of $TiO_2$ such as $Ti_xO_{2x-1}$ is very unstable.

Furthermore, the rutile crystals of such a panel are not ferroelectric as the products which will be proposed below, so that they cannot be applied for display devices utilizing polarisation phenomena.

SUMMARY OF THE INVENTION

The object of the present invention is to provide a panel of anisotropic material comprising acicular crystals enclosed in a vitreous or ceramic matrix, wherein said crystals consist essentially of ferroelectric material. Such a panel composed of acicular ferroelectric crystals presents the major advantage of having an electrical conductivity which can be easily controlled, since it is not affected by the environmental conditions. Such a panel may also, because of its ferroelectric behaviour, be advantageously applied in display devices utilizing polarisation phenomena.

A further object of the present invention is to provide an improvement to the above method which allows better adjustment of the crystal growth conditions from one panel face to the other, in particular by maintaining the thermal gradient at a constant value during the entire duration of this growth, with a view to obtaining crystals of very regular structure and of good parallelism over their entire length.

A further object of the invention is to ensure good reproducibility of the characteristics of the panel obtained by the method. To this end, the method according to the invention is characterised in that the heat treatment is carried out by placing the layer of vitreous composition on the surface of a fused metal bath consisting of a metal or alloy of melting point lower than the melting point of the glass, the lower face of the layer of vitreous composition in contact with the bath surface being at a higher temperature than the upper free face of the layer, and simultaneously controlling the temperature of the two faces of said layer in such a manner as to maintain the thermal gradient at an essentially constant and sufficiently high value throughout the entire duration of growth of the crystalline phase such that the direction of maximum growth of the crystals thus formed is perpendicular to the faces of the panel throughout the whole thickness thereof.

Tin is preferably used as the metal forming the metal bath. A tin alloy may equally be used advantageously.

Any appropriate mixture may be used as the mixture of mineral oxides and/or mineral compounds capable of generating such oxides, which is able to form a homogeneous composition on melting, which may be solidified at will either in the form of a homogeneous glass or in the form of a ceramic glass.

Various mixtures of this type have already been described in publications. A homogeneous molten mass may be obtained by bringing one of these mixtures to a temperature sufficient to melt it completely and then maintaining it at such a temperature for a period of time sufficiently long (generally several hours) for it to homogenise. Such a mass solidifies in the form of a ceramic glass if its temperature is lowered so slowly that nucleation and crystal growth are able to take place before its viscosity becomes too high, as a result of solidification, to prevent crystallisation phenomena.

In general, a cooling speed of the order of a few degrees per minute over the temperature range in the neighbourhood of its crystallisation temperature (approximately 900° to 1200° C.) is suitable to obtain solidification in the form of ceramic glass.

In contrast, if the temperature of the molten mass is lowered at a speed greater than a few tens of degrees per minute, as is the case in general when the mass is allowed to cool spontaneously, solidification takes place too rapidly for crystallisation to occur, and a homogeneous glass is obtained.

According to one particularly advantageous embodiment of the method for obtaining a panel of anisotropic ceramic glass comprising electrically conducting acicular ferroelectric crystals enclosed in an insulating vitreous matrix, the panel having a high electrical conductivity in a direction perpendicular to its faces and a negligible conductivity in a direction parallel to its faces, the homogeneous composition prepared from the starting mixture of mineral compounds consists of the following oxides within the proportions indicated below, the parts being expressed in moles:

| | |
|---|---|
| BaO | 25 to 34 |
| SrO | 0 to 10 |
| TiO$_2$ | 28 to 36 |
| SiO$_2$ | 16 to 30 |
| Al$_2$O$_3$ | 3 to 8 |
| Na$_2$O | 0 to 5 |
| P$_2$O$_5$ | 0 to 3 |
| CaF$_2$ | 0 to 2 |
| La$_2$O$_3$ | 1 to 7 |

Such a composition leads as will be shown below, to the obtention of a panel of anisotropic material, the acicular crystals of which essentially comprise barium titanate or solid solutions thereof.

According to other embodiments, the homogeneous composition may also be prepared from a starting mixture comprising other suitable chosen mineral compounds, so as to lead to the obtention of a anisotropic panel the acicular crystals of which will comprise other ferroelectric materials. As other possible ferroelectric materials, it is thus possible to obtain other titanates such as those of Sr, Pb, La, titanosilicates such as fresnoite, niobiates such as those of Ba, Na, K, L, zirconates such as those of Sr and Pb, etc. or a combination of these compounds (barium titanate included).

The layer of homogeneous composition in the vitreous state in the shape and dimensions of the panel may be obtained in any suitable manner, for example, directly from the homogeneous mass originating from the fusion and homogenisation of the initial mixture of mineral compounds, or by casting this mass so as to give it the shape of the panel and then cooling it fairly rapidly so that it solidifies as homogeneous glass.

The expression "working temperature" with reference to the glass is used in this Specification in the sense generally attributed to it in the technical field in question, i.e. the temperature at which the common logarithm to base 10 of the glass viscosity (expressed in poises) is equal to 4. In general, in the case of compositions which may be considered for effecting the method according to the invention, the working temperature is of the order of 1000° to 1300° C. Any appropriate method may be used to establish the thermal gradient perpendicular to the faces of the composition layer, for example, the device described hereinafter may be used.

BRIEF DESCRIPTION OF THE DRAWINGS

The accompanying drawings show diagrammatically and by way of example a device which may be used for effecting the method according to the invention, a diagram representing the variation in temperature (thermal profile) of the layer of vitreous composition as a function of time when operating the method according to the invention (by way of comparison, the thermal profile obtained during operation of the method described in U.S. Pat. No. 3,758,705 is also shown in this latter diagram), and micrographic sections showing the structure of a glass panel manufactured by the method according to the invention and, for comparison, the structure of a glass panel manufactured by a similar method.

FIG. 3 also shows a diagram representing the thermal profile obtained during the effecting of the method described in Example 2 of the U.S. Pat. No. 3,758,705, and also the thermal profile obtained by operating in a manner similar to the method according to the invention but without maintaining the thermal gradient constant.

DESCRIPTION OF THE PREFERRED EMBODIMENTS

Figure 1:
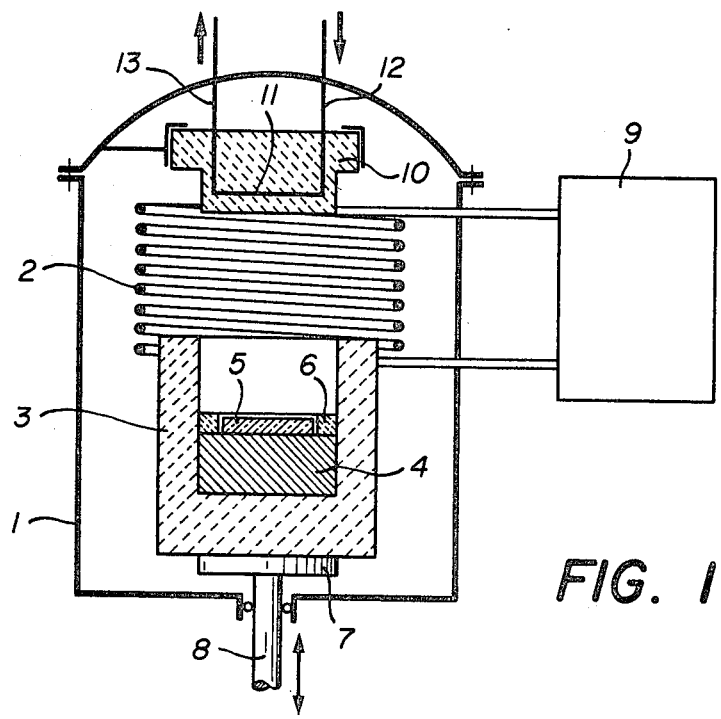
FIG. 1 is a diagrammatic section through the device prior to the operation in which the composition to be treated by the method according to the invention is brought to a temperature at least equal to its working temperature, this composition being in the form of a homogeneous vitreous layer of the dimensions of the panel to be obtained, and a thermal gradient is established perpendicular to its faces.
Figure 2:
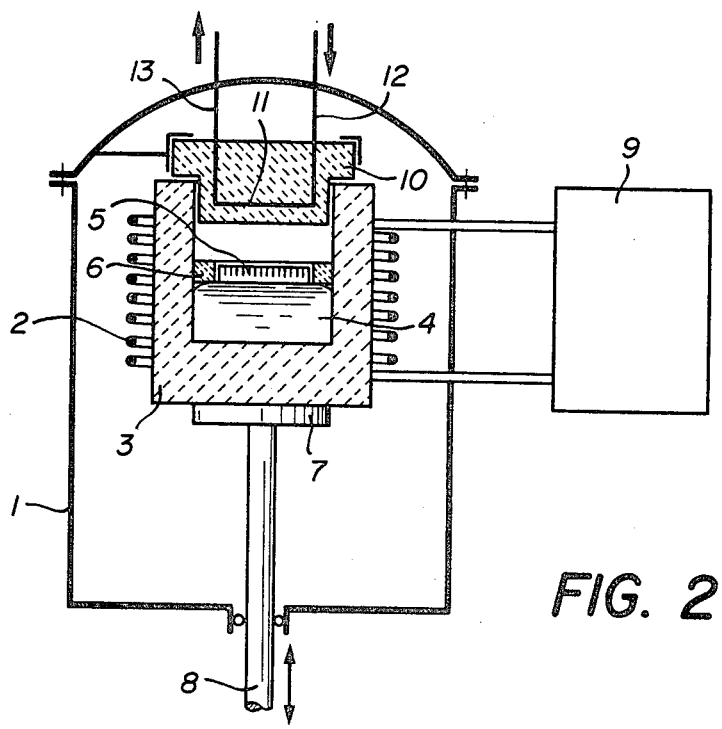
FIG. 2 is a diagrammatic section through the device during the operation in which the temperature of the composition is lowered from a temperature at least equal to its working temperature, so as to induce nucleation and growth of the crystalline phase.

The device shown in FIGS. 1 and 2 comprises a tight enclosure 1 provided with means, not shown on the drawing, to enable a vacuum to be obtained in the enclosure or to establish an inert gas atmosphere therein at a pressure equal or less than atmospheric pressure.

The enclosure 1 contains an induction coil 2 cooled by internal circulation of a suitable fluid, such as water, and connected to a high frequency electric current generator 9, so as to form an induction furnace.

A hollow graphite susceptor 3, likewise situated in the enclosure 1, forms a container holding a mass of metal 4 with a melting point lower than that of the glass, for example, pure tin, lead or a tin lead alloy, etc., on which the sample 5 of the composition to be treated by the method is placed. The sample 5 is kept in place by a graphite ring 6.

A mobile support 7 provided with a sliding rod 8 enables the susceptor 3 and its contents to be moved at will from the position shown in FIG. 1 to the position shown in FIG. 2 and vice versa, without prejudicing the tightness of the enclosure 1.

In the position shown in FIG. 1, the susceptor 3 is external to the coil 2 so that its contents are not heated by induction. The metal mass 4 is than in the solid state and the sample 5 is in the homogeneous vitreous state.

A graphite block 10 of such a shape and size as to enable it to fit into the opening in the susceptor 3 in the manner of a cover or plug (see the position shown in FIG. 2) and provided with an internal cooling circuit 11 using the circulation of a suitable fluid such as air or water (fed to and discharged from the circuit 11 by suitable conduits 12 and 13 in the manner indicated diagrammatically by the arrows) enables the temperature of the upper free surface of the sample 5 to be controlled.

In the position shown in FIG. 2, the susceptor 3 is internal to the coil 2 and its contents are heated by induction. The metal mass 4 is in the molten state and the sample 5 is subjected to a thermal gradient between a temperature $T_1$ at its upper free face and a temperature $T_2$, greater than $T_1$, at the molten metal mass 4.

Preferably, while the susceptor 3 is being induction heated by the coil 2 (FIG. 2), the interior of the enclosure 1 is under vacuum or under an inert gas atmosphere, for example, under an argon atmosphere.

EXAMPLE 1

A glass is prepared having the following composition (expressed in molar percentage):

| | |
|---|---|
| BaO | 27.2 |
| SrO | 7.0 |
| $TiO_2$ | 34.4 |
| $SiO_2$ | 20.6 |
| $Al_2O_3$ | 3.5 |
| $Na_2O$ | 3.5 |
| $P_2O_5$ | 2.0 |
| $CaF_2$ | 1.8 |
| $La_2O_3$ | 2.5 |

This is obtained by starting from a homogeneous mixture of the oxides indicated above in the powdered state, in the appropriate proportions (however instead of the oxide $Na_2O$, the carbonate $Na_2CO_3$ is used in a quantity corresponding to the correct proportion of $Na_2O$), and melting the mixture by heating to 1550° C. in a platinum crucible. The molten vitreous mass obtained in this manner is kept at this temperature for four hours to ensure that the mass is properly homogeneous, and is then rapidly cast into a flat bottom graphite mould in the form of a layer of 8 millimeters thickness. The layer is left to solidify by spontaneous cooling to atmospheric temperature, over about three hours. In this manner a homogeneous glass panel is obtained.

A disc 10 centimeters in diameter cut from this panel is placed in a device identical to that shown in the accompanying drawing, the susceptor 3 being in the position shown in FIG. 1 (in the device the disc occupies the position shown by the reference numeral 5). The metal mass 4 consists of pure tin.

An argon atmosphere at atmospheric pressure is established in the enclosure, a high frequency current is passed through the coil 2 and the susceptor 3 is gradually moved upwards to bring it into the position shown in FIG. 2, with the support 7 rising at a speed such that the temperature of the lower face of the disc 5 is raised from 20° to 400° C. in one hour, and then from 400° to 1300° C. in 30 minutes, and finally from 1300° to 1485° C. in one hour (the heating power is progressively increased over the same time).

When the suceptor 3 is in the extreme position shown in FIG. 2 and the temperature of the lower face of the disc 5 reaches 1485° C. (the temperature of the mass of tin 4 being likewise 1485° C.) the glass disc 5 is then in the plastic state, its lower face in contact with the molten tin being at the same temperature as this latter (1485° C.)) and its upper free face being at 1375° C. Between these two faces, there is thus established a thermal gradient having a value of 137.5° C. per centimeter perpendicular to the said faces. The heating power is then reduced so that the mass of tin 4 cools at a constant cooling speed of 0.96° C. per minute until its temperature reaches 1240° C.

Simultaneously, the graphite block 10 is cooled at a controlled cooling speed such that the temperature of the free surface of the disc 5 likewise falls at a constant cooling speed of 0.96° C. per minute, until it reaches 1130° C., so that the value of the thermal gradient perpendicular to the faces of the disc remains constant at 137.5° C. per centimeter.

During this stage of the procedure, the disc 5 progressively solidifies starting from its upper free face, into a panel of ceramic glass comprising acicular crystals with a diameter of the order of 50 microns, lying perpendicular to the disc faces and enclosed in a vitreous matrix, the average distance between two neighbouring crystals being of the order of 50 and to 100 microns. The nucleation of these crystals commences from the free face of the disc when its temperature is 1350° C. The crystals grow progressively towards the opposite face of the disc (in contact with the tin bath 4) and they reach the latter when its temperature has likewise fallen to 1250° C.

When the temperature of the tin bath is 1240° C. the heating current to the inductor 2 is switched off and the susceptor 3 and its contents cool to ambient temperature in about three hours.

The crystals are identified as consisting of barium titanate $BaTiO_3$ by X-ray diffractometry.

The electrical resistivity of the panel is 40 Ohm. cm in a direction perpendicular to the panel thickness, and $10^7$ Ohm. cm parallel to its faces.

Figure 3:
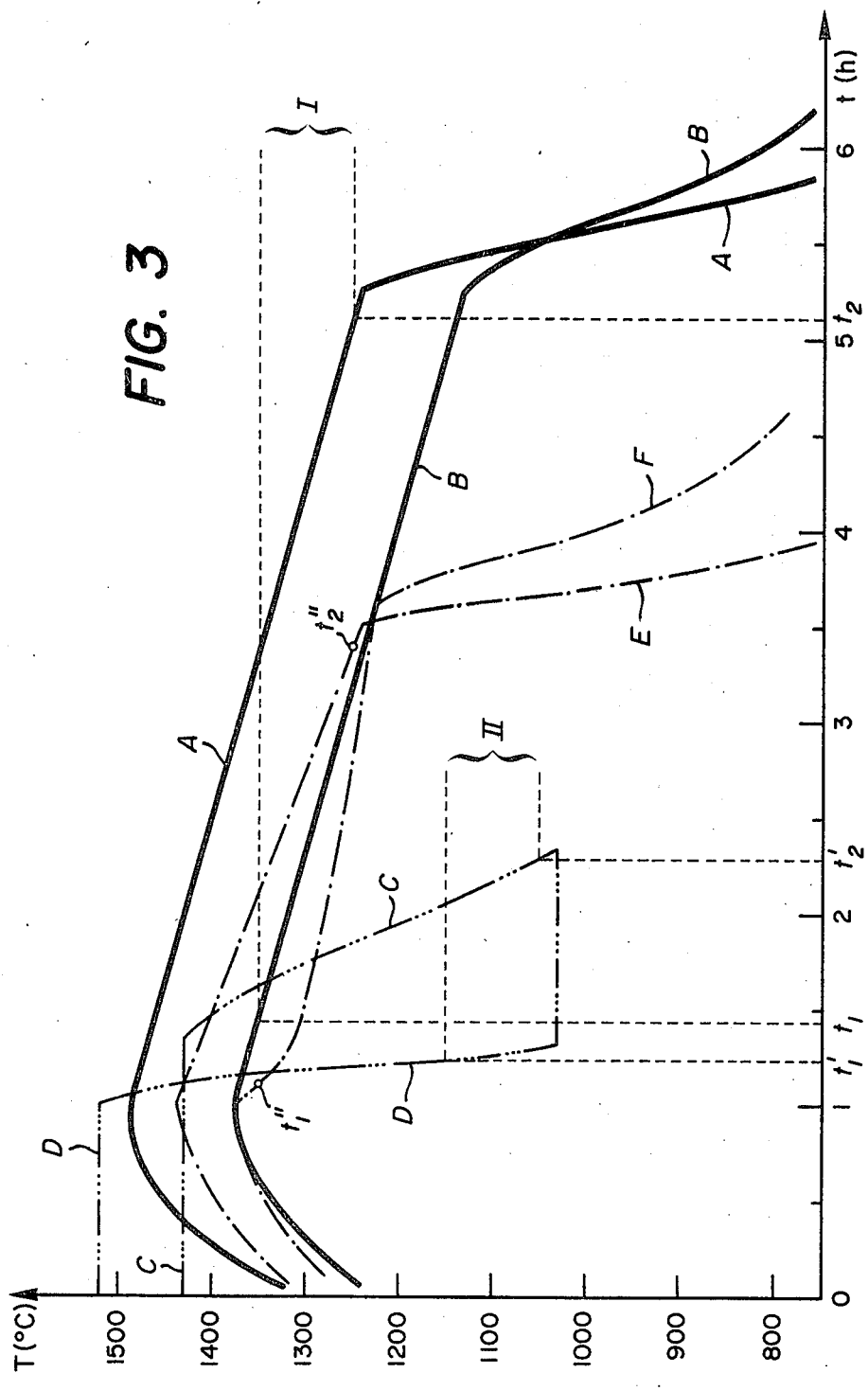
FIG. 3 is a diagram showing the variation in temperature of the layer of vitreous composition as a function of time during the effecting of the method according to the invention, under the conditions indicated hereinafter in Example 1.

Curve A of FIG. 3 shows the variation in temperature of the lower face of the vitreous composition layer, i.e. the face in contact with the metal bath, as a function of time during the operation of the method as described. The abscissa represents the time in hours and the ordinate the temperature in degrees centigrade.

Curve B of FIG. 3 shows the variations in temperature of the free upper face of the vitreous composition layer as a function of time. The crystallisation range of the crystalline phase (upper limit approximately 1350° C., lower limit approximately 1250° C.) is shown by the bracket indicated by the reference numeral I.

It can be seen that at commencement of growth of the crystalline phase (at time $t_1$) the temperature of the upper face of the vitreous composition layer is 1350° C. and the temperature of its lower face is 1460° C. The thermal gradient is 137.5° C. per centimeter. At the end of longitudinal crystal growth of the crystalline phase (at time $t_2$), the temperature of the upper face of the layer is 1140° C. and the temperature of its lower face is 1250° C. The thermal gradient is still 137.5° C. per centimeter.

The thermal gradient of 137.5° C. per centimeter is maintained constant throughout the entire duration (from $t_1$ to $t_2$) of growth of the crystalline phase.

Curve C of FIG. 3 shows the variation with time of the surface temperature of the vitreous composition mass during operation of the method described in Example 2 of U.S. Pat. No. 3,758,705, curve D of this figure showing the temperature variation of the bottom of the mass.

The crystallisation range of the crystalline phase (reduced) rutile), the upper limit of which is of the order of 1150° C. and the lower limit is of the order of 1050° C. (as shown in FIG. 2 of U.S. Pat. No. 3,758,705), is shown by the bracket indicated by the reference numeral II.

It can be seen that at commencement of growth of the crystalline phase (time $T_2'$), the temperature of the bottom of the vitreous composition mass is 1150° C. and the temperature of the surface of the mass is 1450° C.

At the moment in which the rutile crystals reach the surface of the mass (end of longitudinal crystal growth, time $t_2'$), the temperature of the bottom of the vitreous composition mass is 1030° C. and the temperature of the surface of the mass is 1050° C.

The temperature difference between the bottom of the vitreous composition mass and its surface is therefore not maintained constant throughout the duration of growth of the crystalline phase, this temperature difference being 280° C. at the beginning and 20° C. at the end of longitudinal crystal growth, and reaching a maximum value of 400° C.

Figure 4:
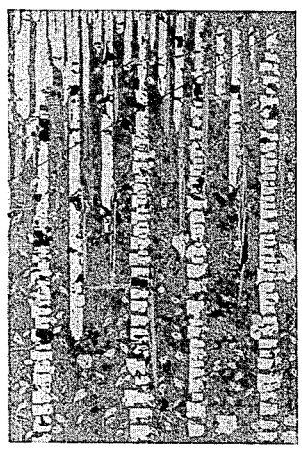
FIGS. 4, 5 and 6 are micrographic sections showing the structure of a glass panel manufactured by the method according to the invention.
Figure 5:
Figure 6:
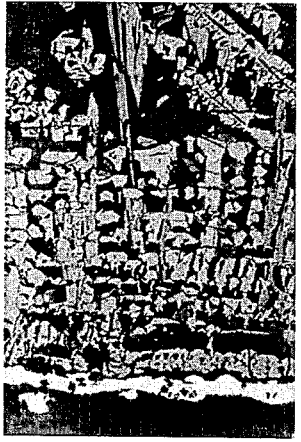

The structure of the panel manufactured in the manner described in Example 1 is shown in FIGS. 4, 5 and 6.

These figures are micrographic sections taken in a plane perpendicular to the panel faces, and magnified 33 times.

FIG. 4 shows the structure obtained in the upper surfaces (free surface) region of the panel on thermal crystallisation treatment, the top of the figure corresponding to said surface.

FIG. 5 shows the structure obtained in the central region of the panel.

FIG. 6 shows the structure obtained in the neighborhood of that surface of the panel in contact with the tin bath on thermal crystallisation treatment, the bottom of the figure corresponding to said surface.

It can be seen from FIGS. 4, 5 and 6 that the crystals (which correspond to the light parts, the vitreous matrix corresponding to the dark parts) are orientated perpendicularly to the faces of the panel, from one face to the other thereof.

EXAMPLES 2 to 4

The procedure is analogous to that described in Example 1 but using glasses of the composition indicated in the accompanying Table I.

The operating conditions and results obtained are indicated in the accompanying Table II.

TABLE I

| | EXAMPLE 2 (proportions by molecular percentage) | | EXAMPLE 3 (proportions by molecular percentage) | | EXAMPLE 4 (proportions by molecular percentage) |
|---|---|---|---|---|---|
| $SrO$ | 25.0 | $BaO$ | 30.4 | $MnO_2$ | 20.0 |
| $TiO_2$ | 30.0 | $TiO_2$ | 30.0 | $TiO_2$ | 2.5 |
| $La_2O_3$ | 5.0 | $La_2O_3$ | 2.6 | $Fe_2O_3$ | 17.5 |
| $SiO_2$ | 30.0 | $SiO_2$ | 22.6 | $Al_2O_3$ | 6.0 |
| $Al_2O_3$ | 4.5 | $Al_2O_3$ | 3.8 | $SiO_2$ | 45.0 |
| $Na_2O$ | 4.5 | $SrO$ | 4.5 | $B_2O_3$ | 4.0 |
| $P_2O_5$ | 1.5 | $CaO$ | 2.5 | $Li_2O$ | 5.0 |
| | | $Na_2O$ | 3.6 | | |

TABLE II

| | EXAMPLE 2 | EXAMPLE 3 | EXAMPLE 4 |
|---|---|---|---|
| Melting point of oxide mixture (°C.) | 1500 | 1450 | 1450 |
| Homogenisation time in molten state | 6 hours | " | " |
| Heating speed of homogeneous glass disc | | | |
| 20° C. to 400° C. | 1 hour | " | " |
| 400° C. to maximum temperature (T°C.) | T = 1500; 30 min. | T = 1450; 30 min. | T = 1450; 30 min. |
| Temperature at commencement of crystal nucleation: | | | |
| Lower face (°C.) | 1400 | 1300 | 1200 |
| Upper face | 1200 | 1150 | 900 |
| Temperatures at end of crystal growth: | | | |
| Lower face (°C.) | 1180 | 1150 | 900 |
| Upper face (°C.) | 980 | 1000 | 600 |
| Cooling speed during crystal growth (°C. per minute) | 2 | 1 | 1 |
| Thermal gradient between panel faces during crystal growth (°C. per cm.) | 400 | 300 | 600 |
| Electrical resistivity of panel: | | | |
| Perpendicular to its thickness (Ohm. cm.) | 0.01 | 40 | 60 |
| Parallel to its faces (Ohm. cm.) | $10^6$ | $10^8$ | $10^4$ |
| Nature of crystalline phase (identified by X-ray diffractometry) | $(Sr,La)TiO_3$ | $(Ba,La)TiO_3$ | $Mn(Fe,Ti)_2O_4$ |

EXAMPLE 5 (comparative):

A glass panel is prepared using the same initial vitreous composition as in Example 1 and proceeding in a manner similar to that described therein.

However, instead of controlling the cooling speed of the upper free surface of the disc 5 to a constant value equal to the cooling speed of the surface in contact with the molten tin bath, this former surface is allowed to cool spontaneously by dispensing with the use of the graphite block 10 (the opening of the susceptor 3 is left uncovered).

The variations in temperature of that face of the disc 5 in contact with the tin bath 4 is shown in this case by curve E of FIG. 3, and the variation in temperature of the upper free face of the disc 5 is shown by curve F of FIG. 3.

The thermal gradient between the faces of the disc 5 is 100° C. per centimeter at the commencement of crystallisation (point $t_1''$ on curve F) and approximately 22° C. per centimeter at the end of crystallisation (point $t_2''$ on curve E).

Figure 7:
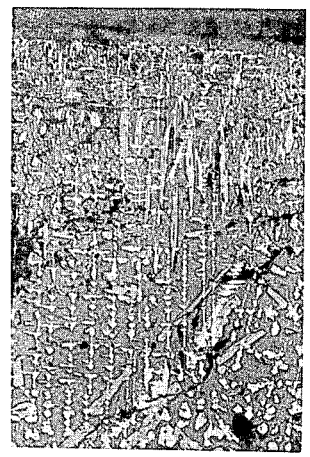
FIGS. 7, 8 and 9 are micrographic sections showing for comparison the structure of a glass panel manufactured by a method similar to that according to the invention.
Figure 8:
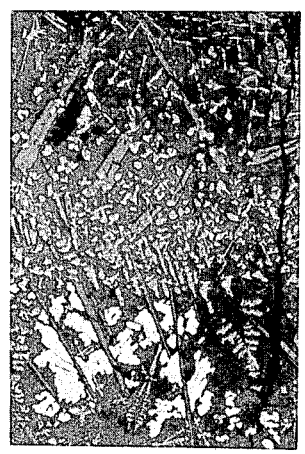
Figure 9:

The panel structure thus obtained is shown in FIGS. 7, 8 and 9, which represent micrographic sections analogous to those of FIGS. 4 to 6.

FIG. 7 shows the structure obtained in the surface region of the panel, commencing at that surface in the upper position on crystallisation treatment.

FIG. 8 shows the structure obtained in the central region of the panel.

FIG. 9 shows the structure obtained in the neighbourhood of that surface of the panel in contact with the tin bath on crystallisation treatment.

It can be seen from FIGS. 7, 8 and 9 that the crystals are orientated perpendicularly to the panel faces in the surface region in the neighborhood of the upper free surface during crystallisation treatment (FIG. 7), but that this orientation is less marked in the central region (FIG. 8) and is totally non-existent in the region in contact with the tin bath during crystallisation treatment (FIG. 9).

This comparative example demonstrates the importance of maintaining the thermal gradient at a constant and sufficiently high value throughout the entire duration of growth of the crystalline phase to obtain acicular crystals perpendicular to the faces of the panel throughout the entire thickness thereof.

According to another particularly advantageous embodiment of the molten bath gradient method of the present invention, it is also possible to manufacture a panel of anisotropic material comprising electrically conducting acicular crystals enclosed in an insulating ceramic matrix (in which said crystals are oriented perpendicularly to the panel faces while traversing the panel from one face to the other), wherein these crystals comprise barium titanate doped with at least one oxide of an adequate metal, so as to provide for the panel a "positive temperature coefficient (PTC)" of electrical resistivity within a given temperature range.

For obtaining such a panel with PTC resistivity, a compacted powdered preform in the shape of a plate is advantageously prepared from an homogeneous starting mixture of mineral compounds, which consists of the following oxides within the proportions indicated below (the parts being expressed in moles percent):

| | |
|---|---|
| BaO | 32-42 |
| TiO$_2$ | 40-50 |
| PbO | 0-10 |
| SrO | 0-8 |
| SiO$_2$ | 2-10 |
| Al$_2$O$_3$ | 0-8 |
| P$_2$O$_5$ | 0-3 |
| X$_m$O$_n$ | 0.03-1, | wherein X$_m$O$_n$ designates at least one oxide of a doping metal capable of providing (in a known manner) a PTC effect when added to barium titanate, or a combination of such oxides (the subscripts "n" and "m" being integers characterizing the oxides of said metals).

As oxides of doping metals capable of providing a PTC effect, one may advantageously use oxides of lanthanides such as lanthanum, yttrium, cerium, samarium and dysprosium, oxides of heavy metals such as niobium, tantalum, tungsten or thorium, oxides of transition metals such as manganese, iron, copper or chromium, or oxides of other metals such as antimony and bismuth, or a combination of such oxides (these doping oxides being advantageously incorporated into the starting mixture at a percentage, in weight percent, lower than 1%).

In a prefered manner, the following doping oxides (or a combination of these oxides) will be used: La$_2$O$_3$ (with a percentage, in weight percent, comprised between 0.1 and 1), Sb$_2$O$_5$ (percentage comprised between 0.05 and 1), Nb$_2$O$_5$ (0.03-1) and Dy$_2$O$_3$ (0.07-1). The combination of Dy$_2$O$_3$ and Sb$_2$O$_5$ in the proportion 1:2 is found to give the best electrical results.

The above-mentioned compacted powdered preform may be obtained for instance by starting from a homogeneous mixture of the oxides indicated above in the powdered state, in the appropriate proportions, bringing the mixture to a temperature sufficient to melt it completely, maintaining it at such a temperature for a period of time sufficiently long (generally several hours) for it to homogenize, casting the melt thus homogenized in a mould, leaving the melt to solidify, pulverizing the solidified product thus obtained, and cold-pressing the powder thus obtained, so as to obtain the desired compacted powdered plate.

The above-mentioned range of composition differs from the range of composition previously disclosed by the lower SiO$_2$ percentage herein used as well as by the addition of doping oxides (in order to obtain desired electrical properties such as reduction of resistivity and PTC effect). The products based on such a range of composition are therefore, due to the low content of SiO$_2$, not glass-forming ceramic mixtures, but they nevertheless lead, thanks to the use of the above-described molten bath gradient method, to the obtention of excellent oriented structures, as it will be shown below.

For performing this molten bath gradient method, the compacted plate thus obtained is directly placed in a device identical to that illustrated on FIGS. 1 and 2 of the present specification, and the tin bath is heated up to a temperature sufficient to melt the plate completely. The cooling treatment is then performed by using a thermal gradient process similar to that previously described (thermal gradient maintained at a value of the order of 150° to 200° C./cm), except that a somewhat greater cooling speed (of the order of 30° C. per minute) is applied through the solidification range.

The structure of the plate thus obtained after this cooling treatment consists (as may be demonstrated by observation of micrographic sections as well as by identification by X-ray diffractometry) of an array of electrically conducting acicular crystals enclosed in an insulating ceramic matrix, wherein said crystals are oriented perpendicularly to the panel faces while traversing the panel from one face to the other, and wherein said crystals are composed in major part of barium titanate doped with the oxide(s) of the doping metals introduced in the starting mixture, the barium titanate being therein present partly in the hexagonal phase and partly in the cubic phase. Concerning the electrical behaviour of the plate thus obtained, the room temperature resistivity is low (of the order of 0.1 to 1000Ω× cm) and no PTC effect may yet be observed.

An additional thermal treatment is thus required for inducting this PTC effect, which thermal treatment consists of heating the panel to an appropriate temperature during a period of time sufficiently long (one or two hours) in an oxygen atmosphere (such as air) so as to induce oxidation of the plate. This heating also leads to the transformation of the hexagonal structure of BaTiO$_3$ to the cubic structure, whereas the oxidation enables the stoichiometry of the oxide to be restored. This additional thermal treatment enables the above-mentioned "Positive Temperature Coefficient of Resistivity" effect to be obtained (in the 90°-250° C. temperature range), while leading to an increase of the subsequent resistivity at room temperature.

Figure 10:
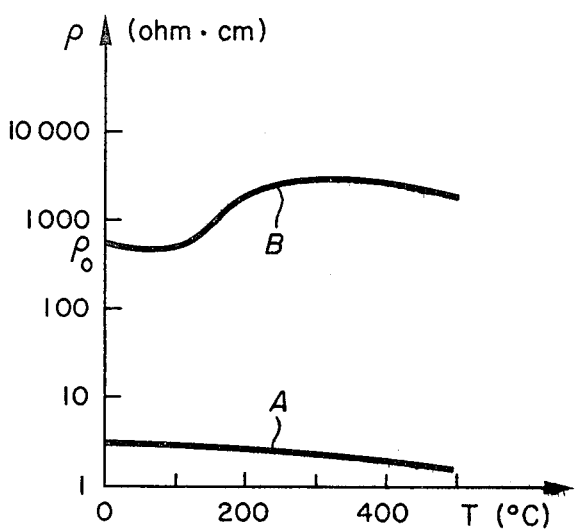
FIG. 10 is a diagram showing the variation in temperature of the resistivity (perpendicular to the faces of the plate) of the plate manufactured according to Example 5.
Figure 11:
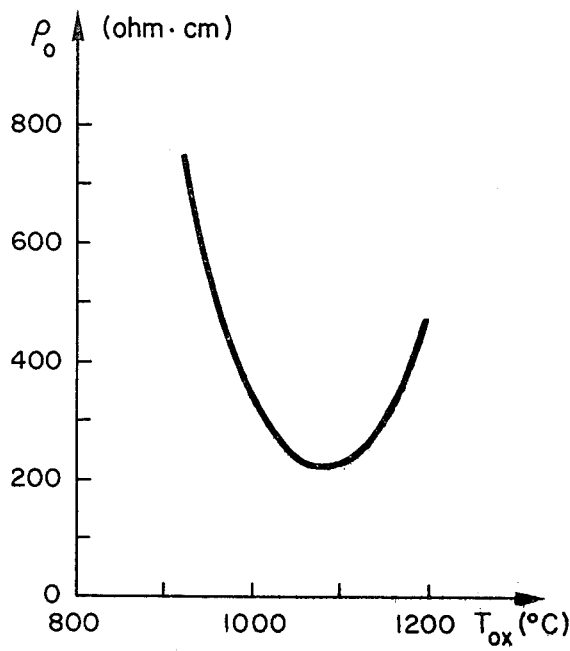
FIG. 11 is a diagram showing the variation of the room temperature resistivity of the plate manufactured according to Example 5, in function of the temperature applied during oxidation treatment.

The electrical behaviour of a typical plate containing doped BaTiO$_3$ (corresponding to that described in subsequent example 5) is shown on the diagram of FIG. 10, which indicates the variations of the resistivity $\rho$ (logarithmic variations) versus temperature T applied to the plate. The curves A and B indicate the electrical behaviour of the plate, respectively, before and after the above-mentioned additional thermal treatment. Curve B shows that at low and ambient temperatures the resistivity is low and decreases only slightly with increase in temperature, while as higher temperatures (in the 80°-250° C. temperature range) there is a strong increase (logarithmic scale) of resistivity with temperature, this strong variation constituting the PTC effect (PTC effect related to the Curie transition of the plate containing ferroelectric BaTiO$_3$). Comparison of curves A and B also shows the strong increase of room temperature resistivity $\rho_0$ subsequent to the oxidation treatment. This increase concerning room temperature resistivity $\rho_0$ depends upon the temperature Tox applied during the oxidation treatment. FIG. 11 indicates the effect of this temperature Tox on the subsequent room temperature resistivity $\rho_0$ for a one hour oxidation treatment in air on a typical plate (also corresponding to that described in subsequent example 5). This FIG. 11 shows that the optimal oxidation heat treatment lies in the 1000°-1200° C. temperature range.

The resistivity at room temperature of the plates containing doped BaTiO$_3$ also depends on the percentage of doping agents present in these plates, so that this resistivity may be easily controlled by varying the doping percentage. This resistivity is found to be minima at compositions below 0.5 mole % of dopants, the resistivity rising very strongly beyond this value.

It is also possible, by incorporating appropriate additives, to modify the above-mentioned composition of the starting mixture in order to shift the PTC effect to higher or lower temperatures (PTC effect related to the Curie transition of the plate). It is thus possible to modify the proportions of SrO as compared to BaO, in order to obtain a decrease of Curie point (10% substitution causing a 15° C. decrease) or to modify the proportions of PbO as compared to BaO, in order to obtain an increase of Curie point (10% substitution causing a 50° C. increase). It is also possible to partly replace $TiO_2$ by $SnO_2$ or $ZrO_2$, in order to obtain a decrease of Curie point (10% substitution causing a 15° C. decrease).

Such anisotropic plates provided with this PTC effect may find many applications in the field of temperature self-regulation, taking into account the fact that the temperature of these plates may be maintained roughly constant without the need for a thermostat or other control when a constant alternative or direct voltage is applied. As a matter of fact, because of their low resistivity at low temperatures, the initial power dissipation is high, so that the warm-up period is short. And at somewhat higher temperatures, the resistivity rapidly increases and the power dissipated decreases, so that an equilibrium temperature may be soon attained and self-maintained (any increase or decrease in temperature beyond equilibrium causing a reduction or increase of power dissipation, thus causing a return to equilibrium. Furthermore since there is no actual switching involved in the temperature control, no suppressor circuit is needed to avoid electric or radio interference. Unlike conventional resistance heaters the danger of overheating with risk of fire, etc. is not possible. Furthermore the power output of such a heater will only vary slightly on changing from 110 to 220 volts for example. Further advantages of ceramic semiconductor resistance heaters include their low density, low specific heat, chemical inertness or corrosion resistance and ease of fabrication. Such materials may be developed for a wide variety of household and industrial applications in particular for heating fluids (air) or temperature control.

EXAMPLE 5

A compacted powdered preform in the shape of a disc is prepared having the following composition (expressed in parts by weight):

| | |
|---|---|
| BaO | 37.88 |
| SrO | 4.5 |
| PbO | 2.5 |
| $TiO_2$ | 44.8 |
| $SiO_2$ | 5.2 |
| $Al_2O_3$ | 2.3 |
| $P_2O_5$ | 2.5 |
| $Dy_2O_3$ | 0.12 |
| $Sb_2O_5$ | 0.2 |

This is obtained by starting from a homogeneous mixture of the oxides indicated above in the powdered state, in the appropriate proportions, melting the mixture by heating to 1600° C. (4 hours) in a crucible, casting the melt in a mould, leaving the melt to solidify, pulverizing the solidified product thus obtained, and cold-pressing the powder thus obtained, so as to obtain the desired compacted powdered disc (10 centimeters in diameter).

The compacted disc is then placed in a device identical to that shown in the accompanying drawings, the susceptor 3 being in the position shown in FIG. 1 and the metal mass 4 consisting of pure tin. The tin bath is heated up first to a temperature of 1100°–1200° C. where it is held constant for about 1 hour under partial vacuum. This step is necessary to evaporate the volatile components from the material which occur during fusion of the mixture and require time to be drawn off. (If this step was not carried out a large number of residual bubbles would be observed in the as-solidified plate). After this treatment the plate is then heated, to ensure that it is completely molten, to approximatively 1550° C. under argon at approximatively 1 atmosphere pressure and held for 2–10 minutes at this temperature before cooling the whole arrangement rapidly at about 30° C. per minute. During this stage the graphite block 10 is being cooled by a stream of air to maintain a temperature gradient across the solidifying plate of approximately 200° C./cm.

Figure 12:
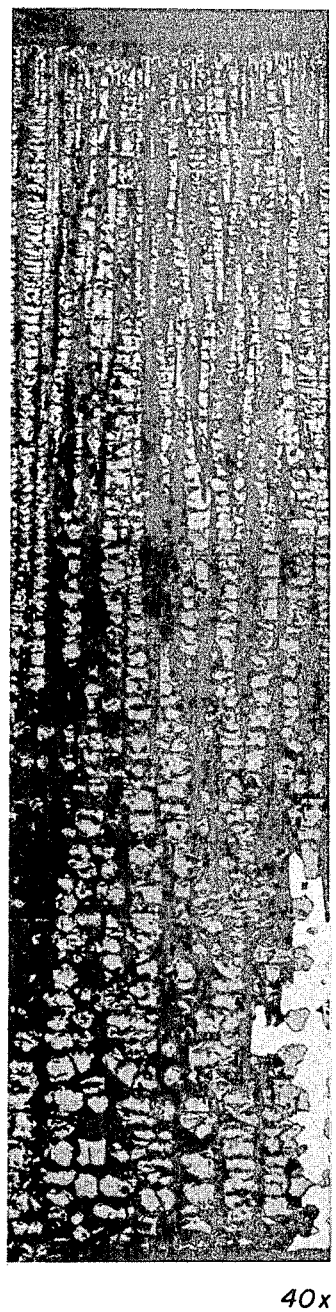
FIG. 12 is a micrographic section showing the structure of the panel manufactured according to Example 5.

The structure of the panel thus obtained is shown in FIG. 12. Thus FIG. 12 clearly demonstrates that this panel contains acicular crystals enclosed in a matrix, which remain perpendicular to the faces of the panel throughout its entire thickness.

These acicular crystals are shown, from X-ray patterns, to be composed in major part of $BaTiO_3$ the remaining comprising portions of $PbTiO_3$ and $SrTiO_3$ in solid solution with $BaTiO_3$. These acicular crystals also contain $Dy_2O_3$ and $Sb_2O_5$, as it can be deduced from the electrical results. With respect to $BaTiO_3$, both hexagonal and cubic $BaTiO_3$ crystals are obtained. Microscope examination shows 75.4 percent by volume of $BaTiO_3$ comprising 40.8% of the cubic phase and 34.6% of the hexagonal phase.

These acicular crystals present a diameter of the order of 25 to 50 microns, with a density of the order of 100 000 dendrites per square centimeters.

The residual interdendritic material (matrix) identified by optical microscopy is shown to comprise $PbTiO_3$, $SrTiO_3$ and $Ba_2Ti$ $Si_2O_8$ crystals, and residual glass rich in $PbSiO_3$.

The electrical behaviour of the plate thus obtained (before the subsequent oxidation treatment) is shown by curve A of FIG. 11, which indicates a room temperature resistivity (resistivity parallel to the dendrites) of the order of $2\Omega$. cm.

An additional thermal treatment is then applied to this panel, which treatment consists of heating the panel to 1100° C. during one or two hours in the air so as to induce oxidation of the plate. The heating also leads to the transformation of the hexagonal structure of $BaTiO_3$ to the cubic structure, whereas the oxidation enables the stoichiometry of the oxide to be restored. This additional thermal treatment enables the PTC effect to be obtained.

The electrical behaviour of the plate thus obtained after this oxidation treatment is indicated by curve B of FIG. 11, which shows that the resistivity of the plate increases strongly with temperature in the 80°–250° C. temperature range, this strong variation constituting the PTC effect. This curve B also indicates a room temperature resistivity (resistivity parallel to the dendrites) of the order of $470\Omega \times$ cm, the room temperature resistivity perpendicular to the crystals being of the order of $2350\Omega \times$ cm.

EXAMPLE 6

A compacted plate is prepared having the following composition (in parts by weight):

| | |
|---|---|
| BaO | 41.3 |
| SrO | 4.5 |
| TiO$_2$ | 45.0 |
| SiO$_2$ | 5.0 |
| Al$_2$O$_3$ | 2.3 |
| P$_2$O$_5$ | 2.7 |
| Sb$_2$O$_5$ | 0.2 |

This compacted plate is then treated in a manner identical to that described in Example 5. The electrical behaviour of the plate thus obtained is similar to that obtained in Example 5, except that the resistivity at room temperature is higher (of two orders of magnitude).

EXAMPLE 7

A compacted plate is prepared having the following composition (in parts by weight):

| | |
|---|---|
| BaO | 40.4 |
| SrO | 4.5 |
| Al$_2$O$_3$ | 2.3 |
| TiO$_2$ | 45.0 |
| SiO$_2$ | 5.2 |
| P$_2$O$_5$ | 2.5 |
| Dy$_2$O$_3$ | 0.1 |

This compacted plate is then treated in a manner identical to that described in Example 5. The electrical behaviour of the plate thus obtained is similar to that obtained in Example 5, except that the resistivity at room temperature is equal to $1.3 \times 10^3$ ohmX cm.

The anisotropic panel of the present invention has the advantages of presenting both ferroelectric properties and semi-conducting properties (with additional PTC effect when adequately doped), so that it may be applied in any field where one of these properties is needed.

The application of such a panel (with PTC effect) to the field of temperature self-regulation has been already mentioned above.

Such a panel may also be applied in display devices utilising polarization phenomena (since ferroelectric material such as barium titanate shows a polarization), for instance in a display device of the type having a sandwich structure of barium titanate anisotropic semi-conducting plate and liquid crystal layer. A liquid crystal layer on a ferroelectric crystal surface may as a matter of fact from orientational patterns following the polarized domain structure in the ferroelectric crystal. Liquid crystal molecules may be affected by the electric potential field, which comes from spontaneous polarization of the ferroelectric crystal. Therefore the liquid crystal molecules take reoriented patterns in correspondence with the polarized domain structure. A display device with high resolution and quick response may consequently be obtained.

We claim:

1. A panel of anisotropic material comprising an array of acicular ferro-electric crystals enclosed in a ceramic or vitreous matrix, said acicular crystals being oriented perpendicularly to the panel faces and traversing the panel from one face to the other, wherein said panel is prepared from a starting composition consisting essentially of the following mineral compounds within the limits of the following proportions which are expressed in parts by mole:

| | |
|---|---|
| BaO | 25 to 42 |
| TiO$_2$ | 28 to 50 |
| SiO$_2$ | 2 to 30 |
| SrO | 0 to 10 |
| Al$_2$O$_3$ | 0 to 8 |
| La$_2$O$_3$ | 0 to 7 |
| P$_2$O$_5$ | 0 to 3 | whereby said acicular ferroelectric crystals comprise at least one titanate of a metal selected from the group consisting of barium, strontium and lanthanum or a mixed titanate of these metals.

2. A panel of anisotropic material comprising an array of acicular ferro-electric crystals enclosed in a ceramic or vitreous matrix, said acicular crystals being oriented perpendicularly to the panel faces and traversing the panel from one face to the other, wherein said panel is prepared from a starting composition which consists essentially of the following mineral compounds in the following proportions which are expressed in parts by mole:

| | |
|---|---|
| BaO | 27.2 |
| TiO$_2$ | 34.4 |
| SiO$_2$ | 20.6 |
| SrO | 7.0 |
| Al$_2$O$_3$ | 3.5 |
| La$_2$O$_3$ | 2.5 |
| P$_2$O$_5$ | 2.0 |
| Na$_2$O | 3.5 |
| CaF$_2$ | 1.8 | whereby said acicular ferroelectric crystals include barium titanate.

3. A panel of anisotropic material comprising an array of acicular ferro-electric crystals enclosed in a ceramic or vitreous matrix, said acicular crystals being oriented perpendicularly to the panel faces and traversing the panel from one face to the other, wherein said panel is prepared from a starting composition which consists essentially of the following mineral compounds within the limits of the following proportions which are expressed in parts by mole:

| | |
|---|---|
| BaO | 32 to 42 |
| TiO$_2$ | 40 to 50 |
| SiO$_2$ | 2 to 10 |
| SrO | 0 to 8 |
| Al$_2$O$_3$ | 0 to 8 |
| P$_2$O$_5$ | 0 to 3 |
| PbO | 0 to 10 | and wherein said starting composition is further doped with at least one oxide of a metal selected from the group consisting of Sb, Bi, lanthanide elements such as La, Y, Ce, Sm and Dy, heavy metals such as Nb, Ta, W and Th, and transition metals such as Mn, Fe, Cu and Cr, or with a plurality of these oxides, whereby said acicular ferroelectric crystals comprise at least barium titanate doped with said oxide or said plurality of oxides.

4. A panel according to claim 3, wherein said doping consists of Dy$_2$O$_3$ and/or Sb$_2$O$_5$.

5. A panel according to claim 3, wherein in said starting composition, TiO$_2$ is partly replaced by SnO$_2$ or ZrO$_2$, so as to decrease the Curie point of said panel.

6. A panel according to claim 3, wherein in said starting composition, the proportions of SrO are modified as compared to BaO, so as to decrease the Curie point of said panel.

7. A panel according to claim 3, wherein said starting compositions the proportions of PbO are modified as compared to BaO, so as to increase the Curie point of said panel.

8. A panel of anisotropic material comprising an array of acicular ferro-electric crystals enclosed in a ceramic or vitreous matrix, said acicular crystals being oriented perpendicularly to the panel faces and traversing the panel from one face to the other, wherein said panel is prepared from a starting composition consisting essentially of the following mineral compounds within the limits of the following proportions which are expressed in parts by mole:

| | |
|---|---|
| BaO | 25 to 34 |
| SrO | 0 to 10 |
| $TiO_2$ | 28 to 36 |
| $SiO_2$ | 16 to 30 |
| $Al_2O_3$ | 3 to 8 |
| $Na_2O$ | 0 to 5 |
| $P_2O_5$ | 0 to 3 |
| $La_2O_3$ | 1 to 7 |
| $CaF_2$ | 0 to 2 | whereby said acicular ferroelectric crystals comprise barium titanate.

* * * * *